United States Patent
Hong et al.

(10) Patent No.: US 8,400,737 B2
(45) Date of Patent: Mar. 19, 2013

(54) SUPPORT STRUCTURE WITH ENHANCED VIBRATIONAL RESPONSE

(75) Inventors: Eo-Jin Hong, Seongnam-si (KR); Woo-sung Kim, Seoul (KR); Yong-han Song, Yongin-si (KR)

(73) Assignee: Seagate Technology LLC, Cupertino, CA (US)

( * ) Notice: Subject to any disclaimer, the term of this patent is extended or adjusted under 35 U.S.C. 154(b) by 272 days.

(21) Appl. No.: 12/767,940

(22) Filed: Apr. 27, 2010

(65) Prior Publication Data

US 2010/0271734 A1    Oct. 28, 2010

(30) Foreign Application Priority Data

Apr. 28, 2009   (KR) .............................. 10-2009-37111

(51) Int. Cl.
  G11B 5/48      (2006.01)
  G11B 21/16     (2006.01)
(52) U.S. Cl. ....................................................... 360/244.8
(58) Field of Classification Search .................. 360/244.8
  See application file for complete search history.

(56) References Cited

U.S. PATENT DOCUMENTS

| | | | | |
|---|---|---|---|---|
| 5,999,369 | A * | 12/1999 | Shimizu et al. ............. | 360/244.5 |
| 6,088,192 | A | 7/2000 | Riener et al. | |
| 6,462,910 | B1 * | 10/2002 | Shimizu et al. ............. | 360/244.8 |
| 6,894,876 | B1 | 5/2005 | Coon | |
| 7,280,316 | B1 | 10/2007 | McCaslin et al. | |
| 7,508,633 | B1 * | 3/2009 | Thaveeprungsriporn et al. ........................... | 360/244.9 |
| 7,573,680 | B1 * | 8/2009 | Kulangara ................. | 360/244.8 |
| 7,595,964 | B2 * | 9/2009 | Oh et al. .................... | 360/294.1 |
| 7,606,000 | B1 * | 10/2009 | Brandts et al. ............. | 360/244.8 |
| 7,757,379 | B1 * | 7/2010 | McCaslin et al. .......... | 29/603.03 |
| 7,898,770 | B1 * | 3/2011 | Zhang et al. ............... | 360/244.5 |
| 7,952,835 | B2 * | 5/2011 | Lee et al. ................... | 360/244.5 |
| 2002/0131211 | A1 | 9/2002 | Nishida et al. | |
| 2005/0007689 | A1 | 1/2005 | Oh et al. | |
| 2005/0207055 | A1 * | 9/2005 | Oh et al. ........................ | 360/75 |
| 2007/0115590 | A1 | 5/2007 | Resh et al. | |
| 2008/0013216 | A1 * | 1/2008 | Lee et al. ................... | 360/244.2 |
| 2008/0024927 | A1 * | 1/2008 | Hong et al. ................ | 360/244.2 |
| 2009/0161259 | A1 * | 6/2009 | Thaveeprungsriporn et al. ........................... | 360/244.2 |
| 2009/0207528 | A1 * | 8/2009 | Resh et al. ................. | 360/244.3 |
| 2010/0271734 | A1 * | 10/2010 | Hong et al. ................ | 360/244.2 |

FOREIGN PATENT DOCUMENTS

| | | |
|---|---|---|
| EP | 1879183 | 1/2008 |
| JP | 10-097773 | 4/1998 |

OTHER PUBLICATIONS

European Search Report issued Dec. 3, 2010 in EP Application No. 10160974.1.

* cited by examiner

*Primary Examiner* — Will J Klimowicz
(74) *Attorney, Agent, or Firm* — Hall Estill Attorneys at Law

(57) ABSTRACT

A support structure with enhance vibrational response. In accordance with some embodiments, an apparatus includes a data storage medium and a magnetic head to write to or read from the medium. The head has a first side and a second side opposite the first side, the first side being closer to a center of the medium than the second side. An actuator is adapted to tilt the first side of the head closer to a surface of the medium than the second side of the head.

17 Claims, 9 Drawing Sheets

CENTER OF DISK

SUPPORT STRUCTURE WITH ENHANCED VIBRATIONAL RESPONSE

CROSS-REFERENCE TO RELATED APPLICATIONS

This application claims the benefit of Korean Patent Application No. 10-2009-0037111, filed on Apr. 28, 2009, in the Korean Intellectual Property Office, the disclosure of which is incorporated herein in its entirety by reference.

BACKGROUND

1. Field of the Invention

The present general inventive concept relates to a hard disk drive, and more particularly, to a hard disk drive including a head stack assembly (HSA) having reduced off-track.

2. Description of the Related Art

A hard disk drive is an auxiliary memory device used in computers, MP3 players, or mobile phones that reads data stored in a disk. During operation of the hard disk drive, the head slider floats a predetermined distance above the disk and reads the data stored in the disk, or writes data into the disk, by using a magnetic head in the head slider to reproduce the data. A head stack assembly supports the head slider which is mounted on a front edge thereof and moves the head slider to a predetermined position on the disk.

When the hard disk drive is physically disturbed or when the head stack assembly accidentally vibrates, the magnetic head may skip from a certain track. A situation in which the magnetic head skips from the track it is supposed to be reading from or writing to is referred to as off-track.

FIG. 1 is a diagram illustrating an off-track caused by disk vibration.

Referring to FIG. 1, when a writing or reading operation is performed, the magnetic head 127(d0) on the head slider 27 and a certain track T(d0) located on a concentric circle about the center of the disk 10 may both be located on a vertical line VL. Since the magnetic head 127(d0) and the track T(d0) are located along the same plane in a horizontal direction at this time, off-track of the head slider 27, or more specifically, of the magnetic head 127(d0), is 0. When the hard disk drive vibrates, an outer circumference of the disk 10 and the head slider 27 of the head stack assembly vibrate in a vertical direction to cause the magnetic head 127 to move off-track. In particular, when the disk 10 and the head slider 27 vibrate downward, a track T(d1) moves toward the outer circumference of the disk 10 while the magnetic head 127(d1) moves toward the center of the disk 10, causing the magnetic head 127 to move off-track.

In the above example, the element label 127(d0) indicates that the magnetic head 127 is located at a certain distance from the center of the disk 10 in a resting state (d0). When the disk 10 vibrates downward, the magnetic head 127 moves a distance from the center of the disk 10 and is in a first vibration state (d1). The track T(d1) may move due to slight amounts of flexion or expansion of the disk 10 during vibration, for example.

On the other hand, when the disk 10 and the head slider 27 vibrate upward, a track T(d2) moves toward the center of the disk 10 while the magnetic head 127(d2) moves toward the outer circumference of the disk 10, so that the magnetic head is forced off-track. Movement of the track T(d2) may be caused by a slight compression of the disk surface during vibration, for example. A positioning error signal (PES) caused by the off-track adversely affects reliability of data writing/reading qualities of the hard disk drive.

SUMMARY

The present general inventive concept is generally directed to a support structure with enhanced vibrational response. In accordance with some embodiments, an apparatus includes a data storage medium and a magnetic head to write to or read from the medium. The head has a first side and a second side opposite the first side the first side being, closer to a center of the medium than the second side. An actuator is adapted to tilt the first side of the head closer to a surface of the medium than the second side of the head.

BRIEF DESCRIPTION OF THE DRAWINGS

Exemplary embodiments of the present general inventive concept will be more clearly understood from the following detailed description taken in conjunction with the accompanying drawings in which:

FIGS. 3 and 4 are expanded perspective views of a part of a head stack assembly according to an embodiment of the present inventive concept, wherein FIG. 3 is an upper side perspective view and FIG. 4 is a bottom perspective view;

DETAILED DESCRIPTION OF THE EMBODIMENTS

Figure 1:
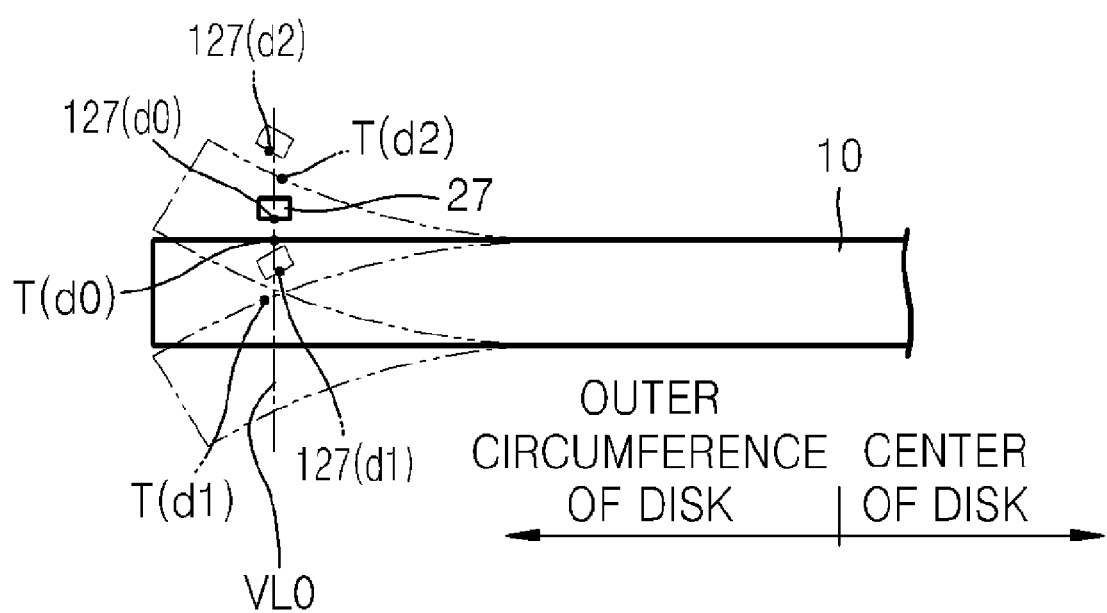
FIG. 1 is a diagram illustrating an off-track caused by disk vibrations.

The present inventive concept will now be described more fully with reference to the accompanying drawings, in which exemplary embodiments of the invention are shown. The inventive concept may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals refer to like elements throughout.

Figure 2:
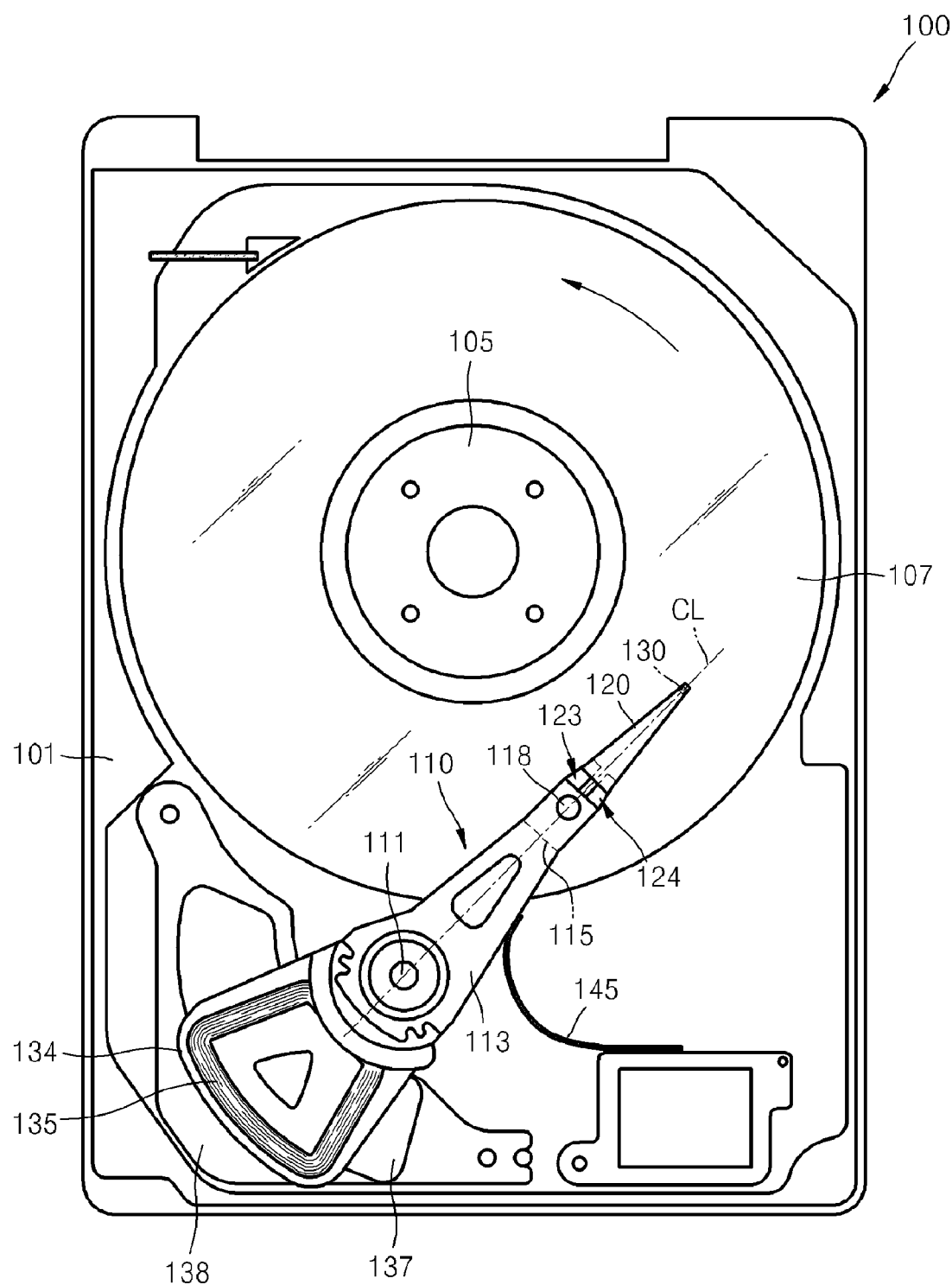
FIG. 2 is a plan view of a hard disk drive according to an embodiment of the present inventive concept.
Figure 3:
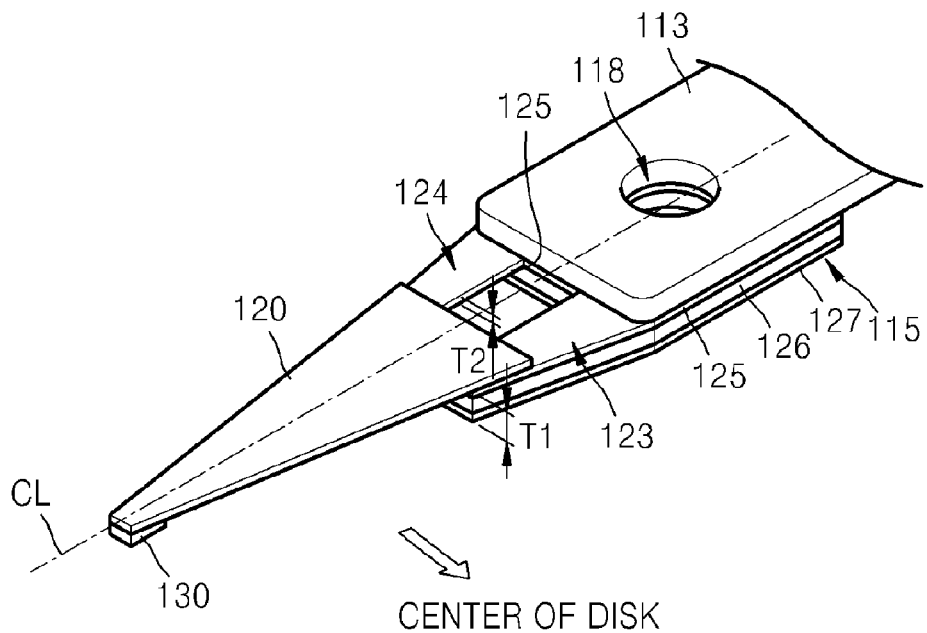
Figure 4:
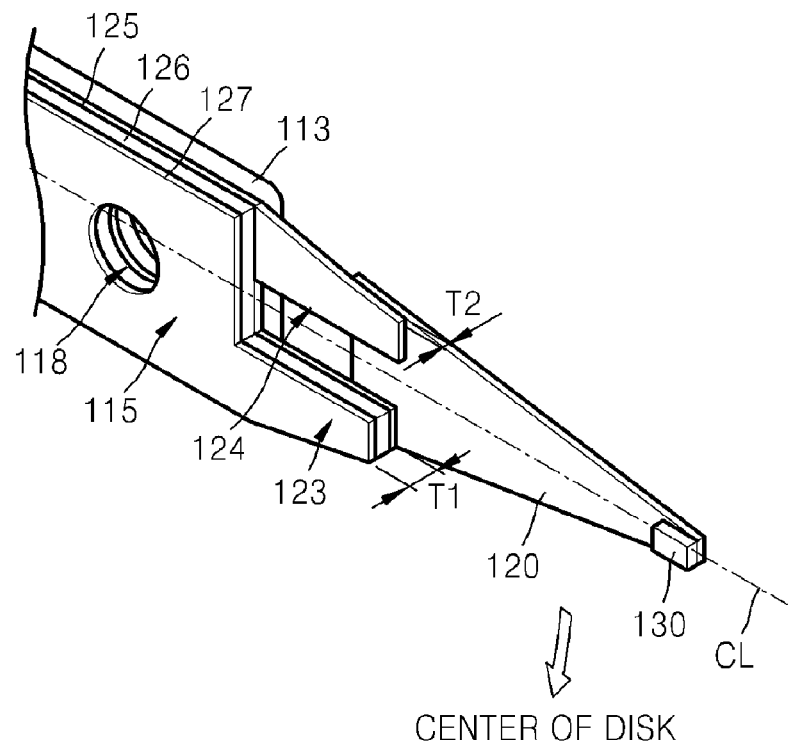

Referring to FIGS. 2 through 4, the hard disk drive 100 includes a spindle motor 105, a data storage medium 107, such as a disk, and a head stack assembly 110 in a housing including a base member 101 and a cover member (not shown) coupled to the base member 101. The spindle motor 105 rotates the disk 107 at a high speed, and is attached to the base member 101. The disk 107 is coupled to the spindle motor 105 to rotate in a direction denoted by an arrow at high speed. Due to the high speed rotation, an air flow which flows in the same direction as the direction denoted by the arrow is induced on a surface of the disk 107.

The head stack assembly 110 (also referred to herein as an "actuator") includes a head slider 130 on which a magnetic head (not shown) performing operations of writing/reading data is located. The head slider 130 records data onto the disk 107 or reproduces (reads) data from the disk 107 after moving to a certain track on the disk 107. The head stack assembly 110 includes a swing arm 113 in which a pivot bearing 111 is inserted to he rotatably mounted on the base member 101. a connecting plate 115 coupled to a front edge of the swing arm 113. a suspension 120 coupled to the connecting plate 115 to vibrate finely, and the head slider 130 mounted on a front edge of the suspension 120. In addition, the head stack assembly 110 includes an over-mold 134 which is coupled to the swing arm 113 and includes wound voice coil 135.

A magnet 137 and a yoke 138 supporting the magnet 137 are located on upper and lower portions of the over-mold 134. The magnet 137, the yoke 138, and the voice coil 135 of the head stack assembly 110 form a voice coil motor to provide a driving force for rotating the head stack assembly 110.

When the air flow caused by the high speed rotation of the disk 107 passes over the surface of the disk 107 and a surface of the head slider 130 facing the disk 107, a lifting force is applied to the head slider 130. The head slider 130 maintains the floating status at a height where the lifting force and the elastic compressing force of the suspension 120 which compresses the head slider 130 toward the disk 107 are balanced. During the floating status of the head slider 130, the magnetic head (not shown) on the head slider 130 performs the recording or reproducing function of the data with respect to the disk 107. The hard disk drive 100 may further include a flexible printed circuit (FPC) 145 which electrically connects the head stack assembly 110 to a main circuit board (not shown) under the base member 101.

The connecting plate 115 connects the front edge portion of the swing arm 113 to the suspension 120, and the front edge portion of the swing arm 113 and the connecting plate 115 may be connected to each other by a swaging operation using a swaging hole 118.

The hard disk drive 100 further includes a pair of hinges 123 and 124 which connect the connecting plate 115 to the suspension 120. The hinges 123 and 124 are located on both sides of a center line CL of the suspension 120. The center line CL extends in a length direction of the suspension 120, and the center line CL is a virtual straight line extending from the head slider 130 to the pivot bearing 111. The first hinge 123 is located on a side which is relatively closer to the center of the disk 107, or to the spindle motor 105, than the center line CL is. The second hinge 124 is located on a side which is relatively farther from the center of the disk 107, or the spindle motor 105, than the center line CL is.

Referring to FIG. 3, a thickness T1 of the first hinge 123 may be greater than a thickness T2 of the second hinge 124. Processes of fabricating the connecting plate 115 and the pair of hinges 123 and 124 will be described as follows. An insulating layer 126 is deposited on a surface of a first metal layer 125 which is formed of a metal material such as stainless steel, and a second metal layer 127 is deposited on a surface of the insulating layer 126. A plate (not shown) may be connected to the connecting plate 115 and the pair of hinges 123 and 124 by using a pressing operation. In addition, a region where the second hinge 124 is formed may be etched to remove the second metal layer 127 and the insulating layer 126, and accordingly, the connecting plate 115 and the pair of hinges 123 and 124 may be formed.

The connecting plate 115, the first hinge 123, and the second hinge 124 may all include the first metal layer 125. In addition, the connecting plate 115 and the first hinge 123 each include the insulating layer 126 deposited on the first metal layer 125 and the second metal layer 127 deposited on the insulating layer 126. However, the second hinge 124 does not include the insulating layer 126 and the second metal layer 127. Therefore, the thickness T2 of the second hinge 124 is less than the thickness T1 of the first hinge 123. In the embodiment illustrated in FIGS. 3 and 4, the thickness T1 of the first hinge 123 is the same as a thickness of the connecting plate 115. However, the present inventive concept is not limited to the above example.

Although it is not shown in the drawings, the suspension 120 may include a load beam which elastically biases the head slider 130 toward the surface of the disk 107 and a flexure supported by the load beam and attaching the head slider 130 to the surface facing the disk 107. The load beam may be coupled to the pair of hinges 123 and 124.

Figure 5:
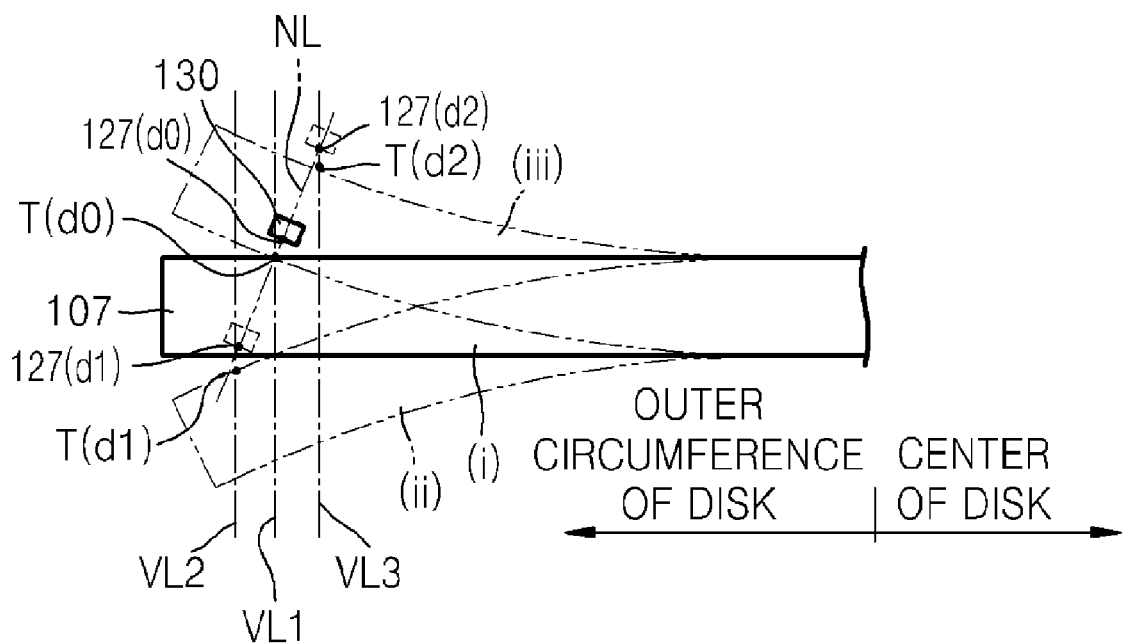
FIG. 5 is a diagram illustrating an off-track reducing effect of the head stack assembly shown in FIG. 4.

FIG. 5 is a diagram illustrating the off-track reducing effect of the head stack assembly shown in FIGS. 3 and 4. Referring to FIG. 5, when the disk 107 shakes, the head slider 130 shakes along a normal line NL to the surface of the head slider 130 facing the disk 107. Since the first hinge 123 (refer to FIG. 4) is thicker than the second hinge 124 (refer to FIG. 4), the normal line NL is slightly slanted with respect to vertical lines VL1, VL2, and VL3.

When the disk 107 and the head slider 130 shake due to the vibrations applied to the hard disk drive 100 (refer to FIG. 2), the magnetic head 127($d$0) formed on the head slider 130 and a certain track T(d0) may be located on the first vertical line VL1 in a state where the disk 107 is in a horizontal mode (refer to (i) of FIG. 5). Therefore, at this time, the off-track may be 0. On the other hand, when the disk 107 is in a downward vibration mode, that is, an outer circumference of the disk 107 is descended (refer to (ii) of FIG. 5), the magnetic head 127($d$1) formed on the head slider 130 and the certain track T(d1) may be located on the second vertical line VL2. Although the magnetic head 127($d$1) and the certain track T(d1) are not located on the first vertical line VL1, they are located on the second vertical line VL2, and accordingly, the off-track may be 0. Also, when the disk 107 is in an upward vibration mode, that is, the outer circumference of the disk 107 is ascended (refer to (iii) of FIG. 5), the magnetic head 127($d$2) and the certain track T(d2) may be located on the third vertical line VL3, and accordingly, the off-track may still be 0. When comparing the case shown in FIG. 5 with the conventional head slider shown in FIG. 1, since the head slider 130 shakes along the normal line NL, the off-track may be reduced compared to the conventional head stack assembly regardless of the vibrations of the disk 107.

The first hinge 123 may be biased toward the disk 107 to cause a first side of the head slider 130 closer to the center of the disk 107 to tilt closer to the disk surface than a second side of the head slider 130 opposite the first side. Since the first hinge 123 is thicker than the second hinge 124, the first hinge 123 is also less flexible than the second hinge 124, which causes the first side of the head slider 130 to remain tilted toward the surface of the disk 107, even when the disk 107 and head stack assembly 110 vibrate.

Figure 6:
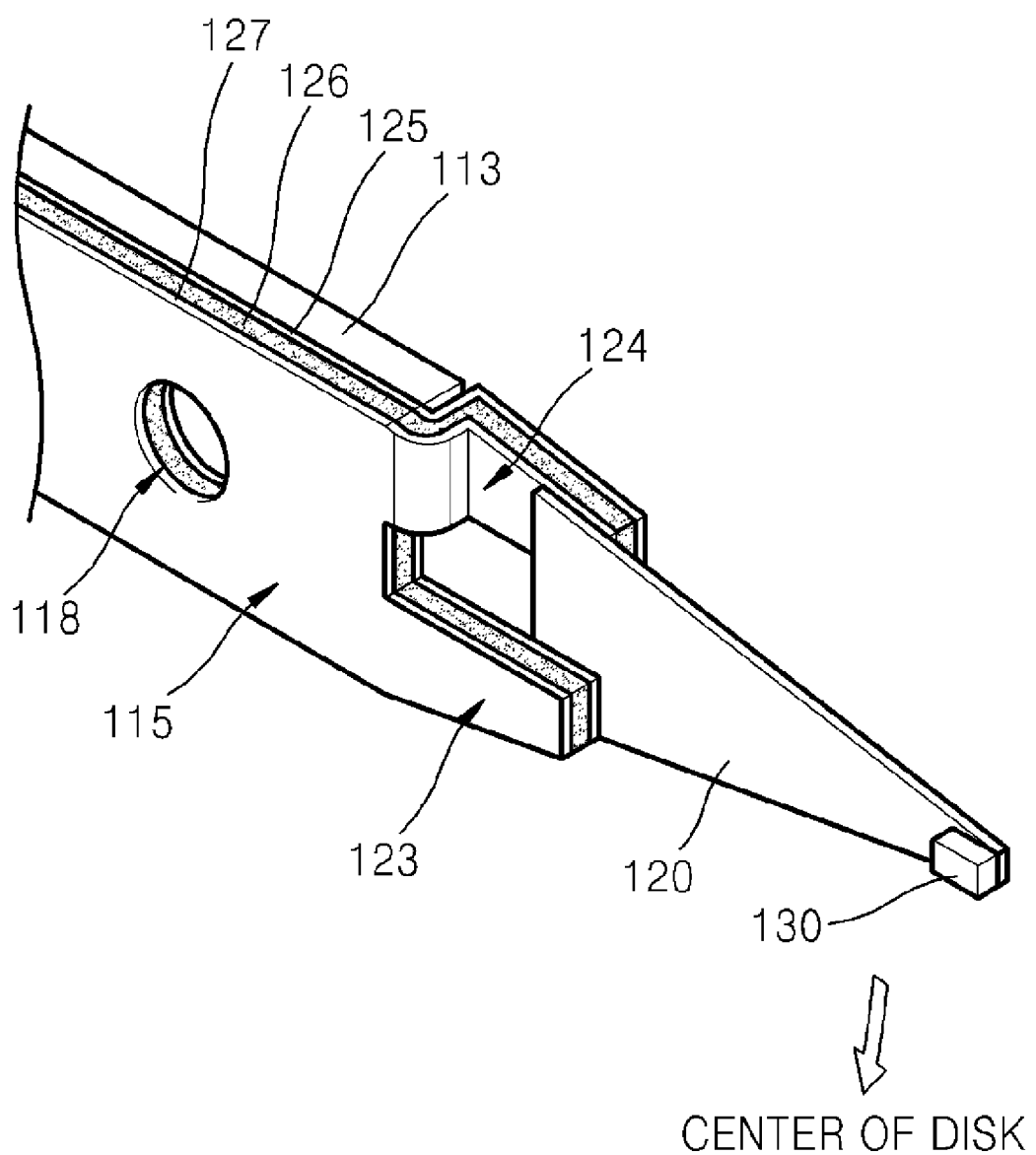
FIG. 6 illustrates a head stack assembly according to an embodiment of the present general inventive concept.

As illustrated in FIG. 6. the second hinge 124 may be part of the connecting plate 115, but it may he bent so that the portion of the second hinge 124 that contacts the suspension 120 is on an opposite surface of the suspension 120 than the first hinge 123. The second hinge 124 may be biased away from a surface of the disk 107 to keep the first side of the head slider 130 tilted toward a surface of the disk 107. Although FIG. 6 illustrates the second hinge 124 having a first metal layer 125, an insulation layer 126, and a second metal layer 127, the second hinge 124 may include only the first metal layer 125, as illustrated in FIG. 4.

Figure 7A:
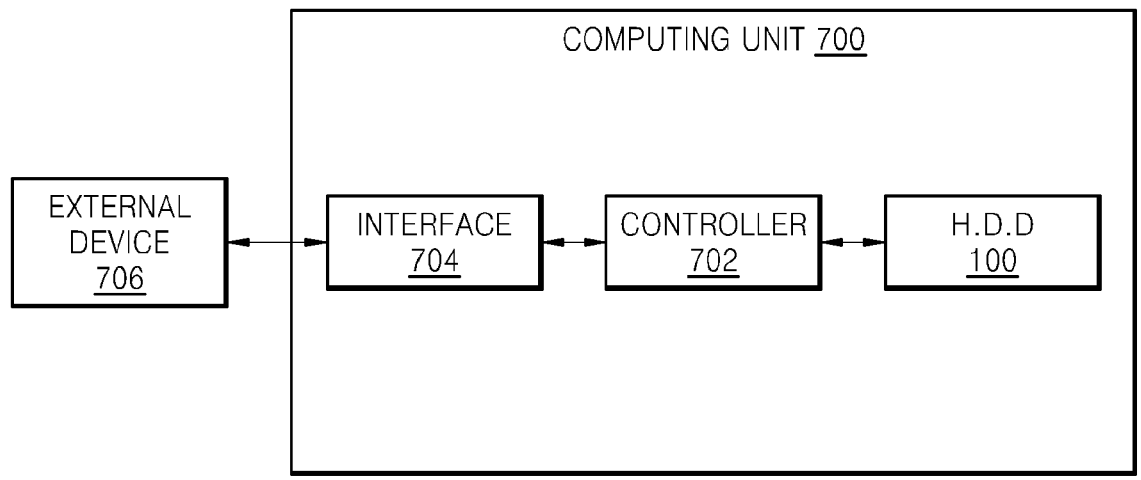
FIGS. 7A and 7B illustrate a computing unit and an interface according to an embodiment of the present general inventive concept.

FIG. 7A illustrates a computing unit 700 including a hard disk drive 100 according to an embodiment of the present general inventive concept. The computing unit 700 may include a controller 702 to control read and write operations of the hard disk drive and an interface 704 to direct the controller 702 to access the hard disk drive 100. The interface 704 may include a data port such as a USB, Ethernet, Firewire, cable, telephone, or wireless data port, or any other port capable of transmitting data. The interface 704 may be connected to an external device 706 via the data port.

Figure 7B:
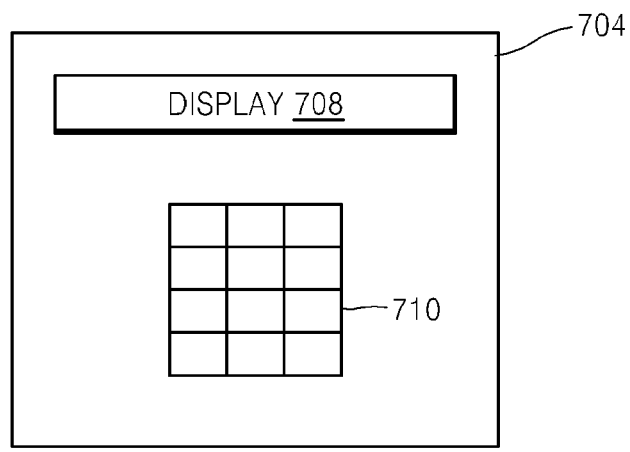

Alternatively, as shown in FIG. 7B, the interface 704 may include a sensory interface, such as a display 708 to display data from the hard disk 100 or to display options to control the controller 704. The interface 704 may also include a data input device such as a keypad 710 to allow a user to select options for reading from and/or writing to the hard disk drive 100. Other user interfaces may include light indicators, LED's, audio output devices such as speakers, a keyboard, a button, a switch, or any other means to allow a user to interact with the computing device to access the hard disk drive.

Figure 8A:
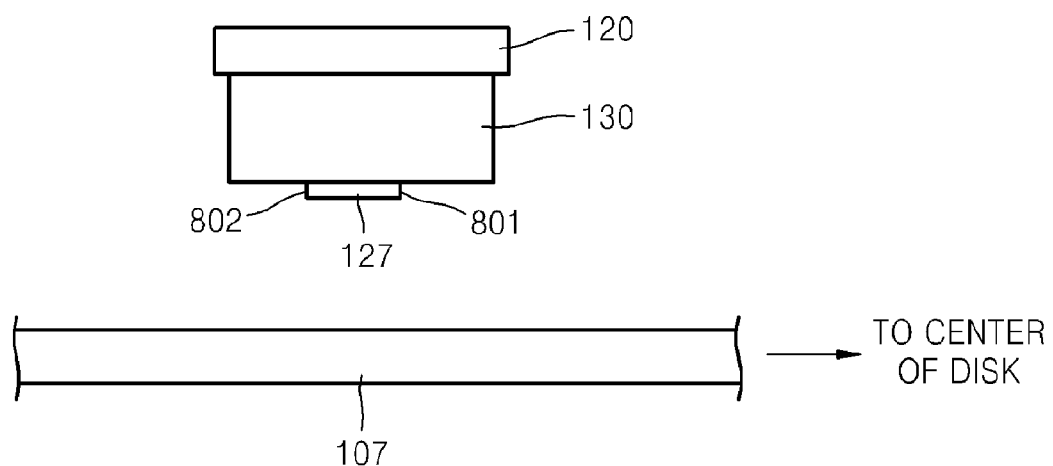
FIGS. 8A and 8B illustrate a head slider and a magnetic head according to the present general inventive concept.
Figure 8B:
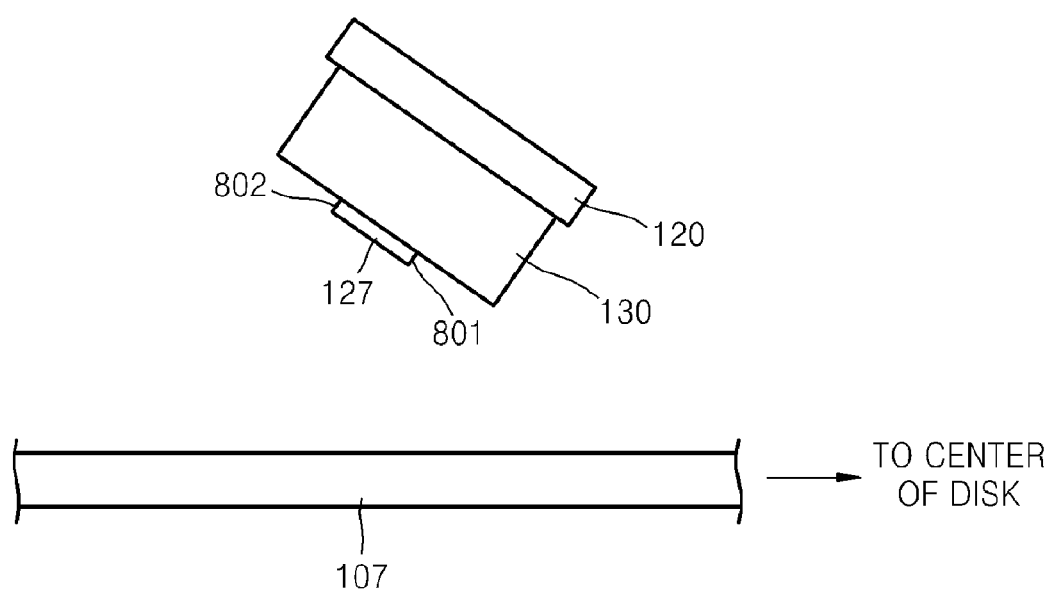

FIGS. 8A and 8B illustrate a relationship between the head slider 130, the magnetic head 127, and the disk 107. As shown in FIGS. 8A and 8B, a first side 801 of the magnetic head is closer to a center of the disk 107 than a second side 802. When the magnetic head 127 is tilted, as in FIG. 8B, the first side 801 is tilted towards the disk 107 and may be closer to the disk 107 than the second side 802, which is tilted away from the disk 107.

Figure 9A:
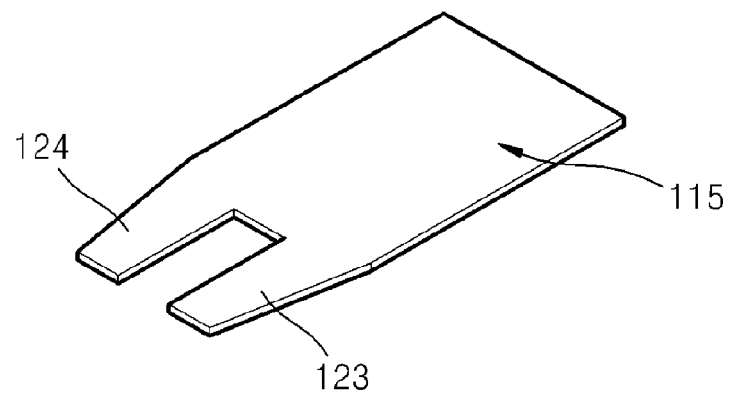
FIGS. 9A and 9B illustrate a method of manufacturing a head stack assembly according to an embodiment of the present general inventive concept.
Figure 9B:
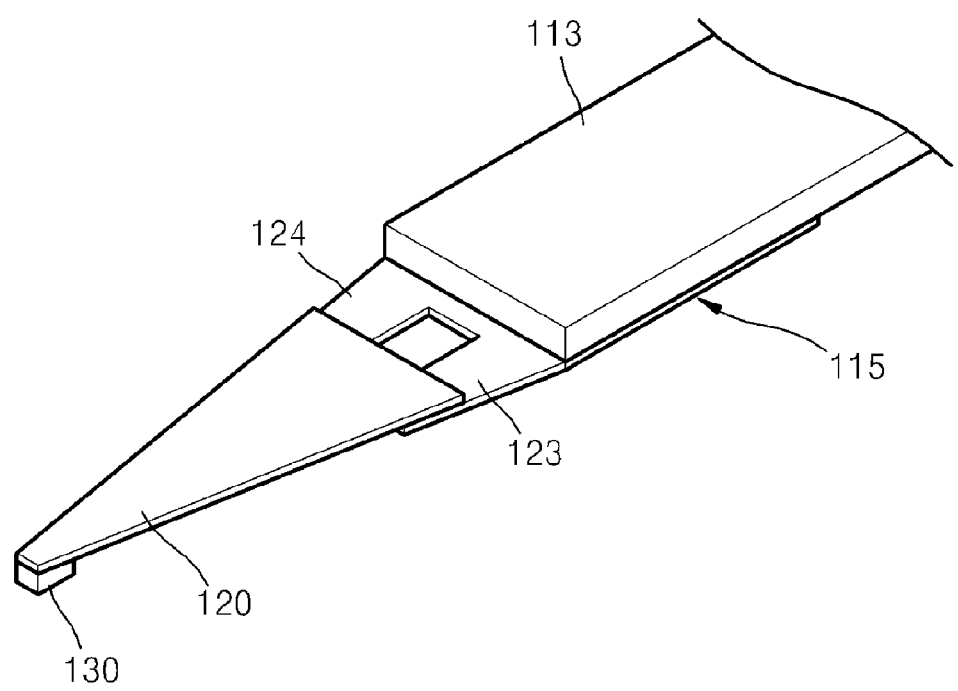

FIGS. 9A-10B illustrate methods of manufacturing a head stack assembly 110, and in particular a connecting plate 115 or the head stack assembly 110. FIG. 9A illustrates forming a connecting plate 115 with a single metal layer. The connecting plate 115 includes first and second hinges 123, 124. The first hinge 123 may be biased towards a disk direction by a bending process, for example. The first hinge 123 may also be treated to have a flexibility less than the flexibility of the second hinge 124. For example, the first hinge 123 may be treated by heat, or by forming the first hinge 123 of less flexible materials than the second hinge 124. FIG. 9B illustrates connecting the plate 115 to the swing arm 113 and the suspension 120. The suspension 120 is connected to an end of the first and second hinges 123, 124.

Figure 10A:
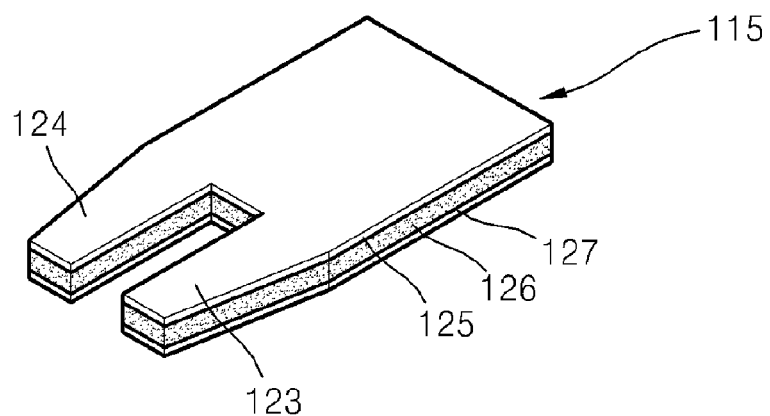
FIGS. 10A and 10B illustrate a method of manufacturing a head stack assembly according to another embodiment of the present general inventive concept.
Figure 10B:
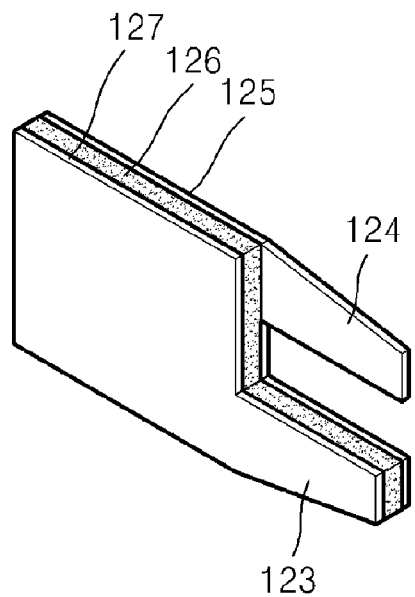

FIGS. 10A and 10B illustrate the method of manufacturing the head stack assembly 110 illustrated in FIG. 4. The connecting plate 115 is formed by forming a first metal layer 125, forming an insulation layer 126 on the first metal layer 125, and forming a second metal layer 127 on the insulation layer 126. Alternatively, the connecting plate 115 may be formed with additional layers or only two layers. As illustrated in FIG. 10B, the second metal layer 127 and the insulation layer 126 are removed from the second hinge 124. The layers 126, 127 may be removed by etching, for example. The connecting plate 115 may then be connected to the swing arm 113 and suspension 120 as illustrated in FIG. 4. The processes of adding layers to the connecting plate 115 and removing layers from the connection plate 115 may be performed either before or after the connecting plate 115 is connected to the swing arm 113 and/or the suspension 120.

While the present general inventive concept has been particularly shown and described with reference to exemplary embodiments thereof, it will be understood that various changes in form and details may be made therein without departing from the spirit and scope of the following claims.

What is claimed is:

1. An apparatus comprising:
a swing arm rotatably mounted on a base member;
a connecting plate coupled to a front edge of the swing arm;
a suspension coupled to the connecting plate; and
a first hinge and a second hinge, the first hinge adapted for placement closer to a center of an adjacent rotatable data storage medium than the second hinge and having an overall thickness greater than an overall thickness of the second hinge, wherein the first hinge comprises first and second metal layers and an insulating layer between the first and second metal layers, and the second hinge includes only the first metal layer to provide the respective first and second hinges with different flexibilities.

2. An apparatus comprising:
a rotatable data storage medium; and
a head stack assembly adapted to write data to and read data from the medium, the head stack assembly comprising:
a swing arm;
a connecting plate coupled to a front edge of the swing arm;
a suspension adapted to support a data transducer adjacent the medium; and
a first hinge and a second hinge respectively located on opposing sides of a center line of the suspension to connect the connecting plate to the suspension, the first hinge being closer to a center of the medium than the second hinge and having an overall thickness greater than an overall thickness of the second hinge, wherein the connecting plate, the first hinge, and the second hinge all include a first metal layer, and the connecting plate and the first hinge each further include an insulating layer deposited on the first metal layer and a second metal layer deposited on the insulating layer.

3. An apparatus, comprising:
a data storage medium;
a magnetic head to write to or read from the medium, the magnetic head including a first side and a second side opposite the first side, the first side being closer to a center of the medium than the second side; and
an actuator adapted to tilt the first side of the magnetic head closer to a surface of the medium than the second side of the magnetic head, the actuator comprising a first hinge adapted to bias a first side of the head in a direction toward the surface of the medium and a second hinge adapted to bias an opposing second side of the head in a direction away from the surface of the medium, the first hinge including a first metal layer, a second metal layer, and an insulation layer between the first metal layer and the second metal layer, the second hinge including only the first metal layer.

4. The apparatus according to claim 3, wherein the first hinge is located closer to a center of the medium than the second hinge.

5. The apparatus according to claim 3, wherein the first hinge has a flexibility less than the flexibility of the second hinge.

6. The apparatus according to claim 3, in which the first hinge has a first overall thickness, the second hinge has a second overall thickness, and the first thickness is greater than the second thickness.

7. The apparatus according to claim 3, further comprising:
a controller to control read and write operations from and to the medium; and an interface to operate the controller to perform read and write operations.

8. An apparatus comprising:

a rotatable data storage medium; and an actuator adapted to tilt a data transducer with respect to the medium via a first hinge which biases a first side of the data transducer toward the medium and a second hinge which biases an opposing second side of the data transducer away from the medium, wherein the first hinge includes a first metal layer, a second metal layer, and an insulation layer between the first metal layer and the second metal layer, and the second hinge includes only the first metal layer.

9. The apparatus of claim 8, in which the first and second hinges are arranged in spaced apart adjacent relation on opposing sides of a center line of a suspension extending from the first and second hinges, the suspension supporting the data transducer adjacent the storage medium.

10. The apparatus of claim 8, in which the first hinge has a first overall thickness and the second hinge has a second overall thickness less than the first thickness.

11. The apparatus of claim 8, in which the first hinge is located closer to a center of the medium than the second hinge.

12. The apparatus of claim 8, in which the first and second hinges have different flexibilities.

13. An apparatus comprising:

a rotatable data storage medium; and an actuator adapted to tilt a data transducer with respect to the medium via a first hinge which biases a first side of the data transducer toward the medium and a second hinge which biases an opposing second side of the data transducer away from the medium, the first and second hinges supported at opposing edges of a connecting plate, wherein the first hinge, the connecting plate and the second hinge each comprise a first metal layer, and the connecting plate and the first hinge each further comprise an insulating layer deposited on the first metal layer and a second metal layer deposited on the insulating layer.

14. The apparatus of claim 13, in which the first and second hinges are arranged in spaced apart adjacent relation on opposing sides of a center line of a suspension extending from the first and second hinges, the suspension supporting the data transducer adjacent the storage medium.

15. The apparatus of claim 13, in which the first hinge has a first overall thickness and the second hinge has a second overall thickness less than the first thickness.

16. The apparatus of claim 13, in which the first hinge is located closer to a center of the medium than the second hinge.

17. The apparatus of claim 13, in which the first and second hinges have different flexibilities.

* * * * *